United States Patent [19]
Verbauwhede et al.

[11] Patent Number: 5,710,914
[45] Date of Patent: Jan. 20, 1998

[54] DIGITAL SIGNAL PROCESSING METHOD AND SYSTEM IMPLEMENTING PIPELINED READ AND WRITE OPERATIONS

[75] Inventors: Ingrid Verbauwhede, Berkeley, Calif.; Gerhard Fettweis, Dresden, Germany

[73] Assignee: Atmel Corporation, San Jose, Calif.

[21] Appl. No.: 581,320

[22] Filed: Dec. 29, 1995

[51] Int. Cl.$^6$ ............................. G06F 9/38; G06F 9/34; G06F 9/42
[52] U.S. Cl. ............... 395/595; 395/384; 395/800.09; 395/393; 364/DIG. 1; 364/DIG. 2
[58] Field of Search ..................... 395/581, 496, 395/800, 595, 380, 310, 421.04, 588, 393, 200.05, 394, 566, 855, 386, 387, 384, 385; 364/DIG. 1, DIG. 2

[56] References Cited

U.S. PATENT DOCUMENTS

| | | | |
|---|---|---|---|
| 4,454,578 | 6/1984 | Matsumoto | 395/380 |
| 4,598,359 | 7/1986 | Boothroyd et al. | 395/421.04 |
| 4,626,989 | 12/1986 | Torii | 395/393 |
| 5,333,284 | 7/1994 | Nugent | 395/394 |
| 5,438,668 | 8/1995 | Coon et al. | 395/380 |

*Primary Examiner*—Daniel H. Pan
*Attorney, Agent, or Firm*—Thomas Schneck

[57] ABSTRACT

A digital signal processing system and method for executing instructions with decode, read, execute, and write pipeline cycles. In the decode cycle, control signals are generated which determine addresses which in turn determine memory locations from which data are to be read and to which processed data are to be written. The system includes a program control unit for processing a sequence of instructions and controlling system operation, a memory, a data processing unit, and a dedicated bus for writing processed data from the data processing unit to the memory. By using a dedicated write bus, the system avoids bus contention in a five stage pipeline operation involving fetch, decode, read, execute, and write operations. A post shift unit connected along the write bus shifts data values that have been output from the data processing unit before they are written to the memory. The system also executes instructions in a pipelined manner, in which addresses for reads from a memory are asserted on an address bus in one pipeline cycle and addresses for writes to the memory are asserted on the address bus in a different pipeline cycle.

12 Claims, 5 Drawing Sheets

DIGITAL SIGNAL PROCESSING METHOD AND SYSTEM IMPLEMENTING PIPELINED READ AND WRITE OPERATIONS

FIELD OF THE INVENTION

The present invention relates to a digital signal processor which includes hardware and software for controlling pipelined execution of instructions, and methods performed during operation of such a digital signal processor.

BACKGROUND OF THE INVENTION

Many different implementations of a digital signal processor (DSP) are well known in the art. A conventional DSP typically includes at least one multiply and accumulate (MAC) unit since, for many signal processing applications the operations of multiplication and addition (accumulation) are frequently used, and an appropriately designed MAC unit (implemented as hardwired circuitry) can perform such operations efficiently.

A conventional DSP typically also employs two physically separate memory units: a program memory for storing instructions to be executed by the DSP; and a data memory for storing data to be processed (and optionally also data that has been processed) by the DSP as a result of executing the instructions. The program memory can be a read-only memory (ROM) or a random access memory (RAM) to which data can be written and from which data can be read. The data memory is typically a RAM to which data can be written and from which data can be read.

FIG. 1 is a block level diagram of a digital signal processor (DSP), of the type having a program control unit which can be designed to implement the present invention. The DSP of FIG. 1 includes data memory 6 (connected to address buses AB0 and AB1 and to data buses RB0 and RB1), program memory 4, program control unit (PCU) 2, memory management unit (MMU) 3, arithmetic computational unit (ACU) 10, and input/output unit (IOU) 12.

In implementations preferred for some applications (such as that to be described with reference to FIG. 2), program memory 4 is a single port, read-only memory (ROM) with an array of storage locations 32 bits wide and 64K words deep, and data memory 6 is a dual port, random-access memory (RAM) with an array of storage locations 16 bits wide and 64K words deep. In such implementations, one port of dual port memory 6 can receive a 16-bit address (from 16-bit address bus AB0) and at the same time, the other port of memory 6 can receive another 16-bit address (from 16-bit address bus AB1). Control means are provided so that two simultaneous reads from memory 6, a simultaneous read from and write to memory 6, or a single read from (or write to) memory 6 can be performed.

MMU 3 preferably includes two independent address generation units for generating two address signals (each identifying a memory location in memory 6 for writing data to or reading data from) and asserting such address signals to address buses AB0 and AB1. More specifically, in response to control bits from PCU 2 (which have been generated in PCU 2 by decoding instructions from program memory 4), MMU 3 asserts address signals on address bus AB0 and/or address bus AB1. Data is read, from the memory location (in memory 6) identified by each address, into pipeline register M0 or pipeline register M1 (or data is written from data bus RB0 and/or data bus RB1 into the memory location identified by each address).

Preferably MMU 3 includes a set of eight address pointer registers (e.g., registers r0–r7 shown in FIG. 5, each for storing a 16-bit address which can be asserted to bus AB0 or AB1), an 8-bit pointer modifier register for each address pointer register (e.g., registers s0–s7 shown in FIG. 5), and a 16-bit adder for adding the contents of any selected address pointer register with the contents of a corresponding pointer modifier register, and writing the result of this addition back into the address pointer register (in response to control bits from PCU 2). Preferably, MMU 3 also includes other registers (e.g., base address register BADR, and circular buffer length registers CL0 and CL1, shown in FIG. 5) for use in modifying the contents of selected ones of the address pointer registers and pointer modifier registers in response to control bits from PCU 2.

In the DSP of FIG. 1, each of first data bus DB0 and second data bus DB1 is preferably 16 bits wide. In variations on the FIG. 1 system, a DSP programmed to implement the invention can have a single port data memory (rather than a dual port data memory), and single address bus and a single data bus (rather than dual address buses and dual data buses).

PCU 2 (a preferred implementation of which will be described below with reference to FIG. 3) includes instruction fetch means (for fetching instructions from program memory 4), an instruction decode unit, and registers for storing control bits generated in the decode unit (for assertion to MMU 3, data bus DB0, or the instruction fetch means).

Arithmetic computational unit (ACU) 10 preferably includes two Multiply and Accumulate (MAC) units which operate in parallel (in response to control bits from PCU 2), and an arithmetic manipulation unit which operates in parallel with the MAC units (in response to control bits from PCU 2).

IOU 12 includes means for monitoring the addresses on address buses AB0 and AB1 to determine the type of memory access being implemented.

One use for the DSP of the present invention is in communications operations. For example, it is contemplated that in a preferred embodiment, the DSP of FIG. 1 is programmed to implement the invention, and this DSP (identified as processor 100 in FIG. 2) is then included in a mobile digital telephone system of the type shown in FIG. 2. In the FIG. 2 system, serial port S10 of processor 100 (DSP 100) receives digitized speech from audio codec unit 106, and DSP 100 sends digital audio data (via port S10) to codec unit 106 for conversion to analog form and then transmission to a loudspeaker. DSP 100 is also connected through analog front end circuit 104 to an RF transceiver 108. Circuit 104 includes means for digitizing a received signal from transceiver 108 (for baseband processing by means within DSP 100), and for converting digital data from DSP 100 into a continuous analog signal for transmission by transceiver 108. In typical implementations, circuit 104 would interrupt DSP 100 to indicate a request for or a presence of data (and circuit 104 is mapped into a memory address of DSP 100 so that circuit 104 can efficiently communicate over one of the data buses within DSP 100). Microcontroller 102 supplies control signals to all other elements of the FIG. 2 system and controls the communication protocol between the FIG. 2 system (which is typically a mobile station) and a remote base station. Typically, microcontroller 102 would be connected to a parallel port (P10) of DSP 100.

Although the above example shows the use of the DSP of the present invention in a communication device, it should be understood that the DSP of the present invention can be broadly used in any application.

For many applications, it is desirable to design a DSP to execute instructions in a pipelined manner. Although pipeline per se is well known, it had not been known until the present invention how to design a DSP to implement pipelining of addresses (with addresses for reads from a memory being asserted in a different pipeline cycle than are addresses for writes to the memory), in a manner avoiding expected address bus and data bus collisions and conflicts.

SUMMARY OF THE INVENTION

A preferred embodiment of the invention is a digital signal processing system and method for executing instructions in a pipelined manner, preferably with separate fetch, decode, read, execute, and write pipeline cycles. During the fetch cycle, an instruction is fetched from program memory and loaded into the IR register. In the decode cycle of preferred embodiments, the fetched instruction is decoded, and control signals are generated which determine addresses which in turn determine memory locations from which data are to be read and to which processed data are to be written. Data determined by the instruction are read from memory in the read cycle, and this data is then processed during the execute cycle (thus generating processed data). Then, in the write cycle, the processed data are written to memory.

A preferred embodiment of the digital signal processing system of the invention includes a program control unit (for processing a sequence of instructions to generate control signals for controlling operation of the system), a memory, a data processing unit, and a dedicated (special-purpose) bus for writing processed data bits from the data processing unit to the memory (e.g., during the write cycle of an instruction pipeline). By using such a dedicated write bus (in addition to a general purpose data bus for transferring data read from memory, as well as control signals), the system avoids bus contention in a five stage pipeline operation. In addition, the system consumes less power than would otherwise be consumed using the general purpose data bus without the dedicated write bus (since each time the write bus is used to write data to memory, less capacitance is switched than would be during use of a general purpose data bus to write data to the memory). By connecting a post shift unit along the write bus, processed data output from the data processing unit (which can be an arithmetic computational unit or "ACU") can efficiently be shifted (and selected ones of the shifted bits discarded) before the processed data is written to the memory. By connecting such a post shift unit close to the data processing unit, a relatively long portion of the write bus (between the post shift unit and the memory) can have smaller width than the remaining (relatively short) portion of the write bus.

Preferably, the system is programmed to implement execute instructions in a pipelined manner (in which addresses for reads from a memory are asserted on an address bus in one pipeline cycle and addresses for writes to the memory are asserted on the address bus in a different pipeline cycle), and in a manner avoiding expected address bus and data bus collisions. Other aspects of the present invention are methods of operating the above described digital signal processing system.

DETAILED DESCRIPTION OF THE PREFERRED EMBODIMENT

Figure 1:
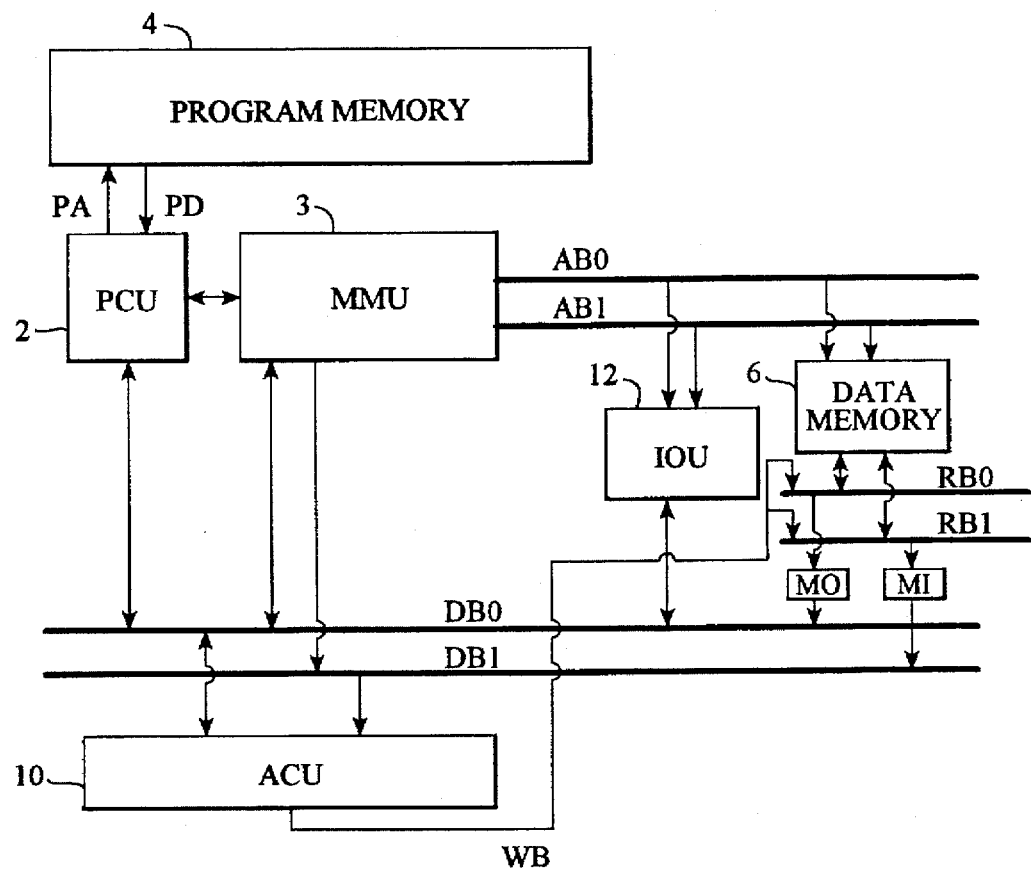
FIG. 1 is a schematic block level diagram of a digital signal processing system (DSP) which includes a program memory, a dual port data memory, general purpose data buses (DB0 and DB1), and a dedicated write bus (WB).
Figure 2:
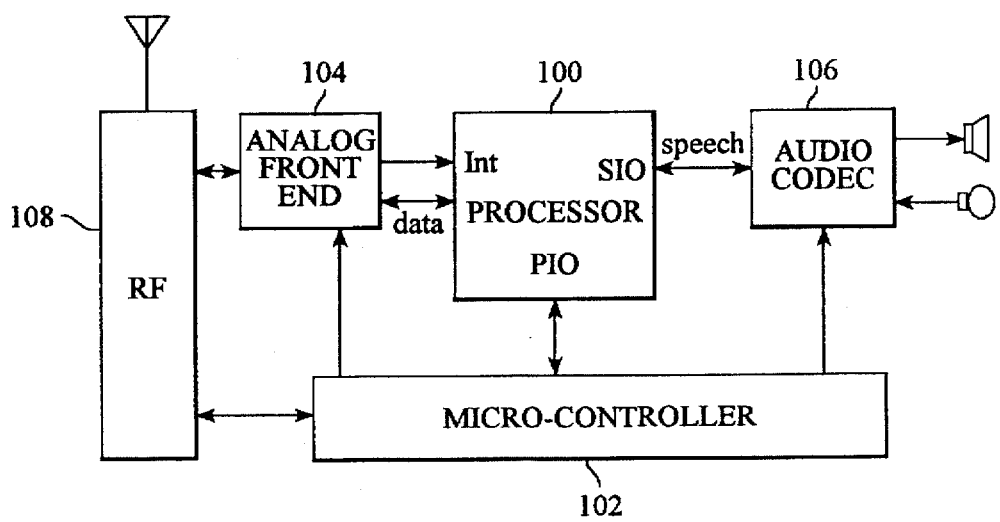
FIG. 2 is a schematic block level diagram of a mobile digital telephone system which includes the DSP of FIG. 1.

In a preferred embodiment, the present invention is implemented in a digital signal processor (DSP) of the type described herein with reference to FIGS. 1, 3, 4, and 5 (which can be included in a system of the type shown in FIG. 2). Additional aspects of such DSP are described in U.S. Patent Applications entitled "Digital Signal Processing Method and System Employing Separate Program and Data Memories to Store Data" by Mihran Touriguian, G. Fettweis, and I. Verbauwhede Ser. No. 08/581,431, filed Dec. 29, 1995, "Digital Signal Processing Method and System Implementing Zero Overhead Nested Loops" by K. Gupta, M. Touriguian, I. Verbauwhede, and H. Neff, Ser. No. 08/581,167, filed Dec. 29, 1995, now U.S. Pat. No. 5,710,913, and "Circuit for Rotating, Left Shifting, or Right Shifting Bits" by J. Muwafi, G. Fettweis, and H. Neff, Ser. No. 08/581,047, filed Dec. 29, 1995, all filed on the same day as the present application and assigned to the assignee of the present application, the disclosures of which are incorporated herein in full by reference.

Figure 3:
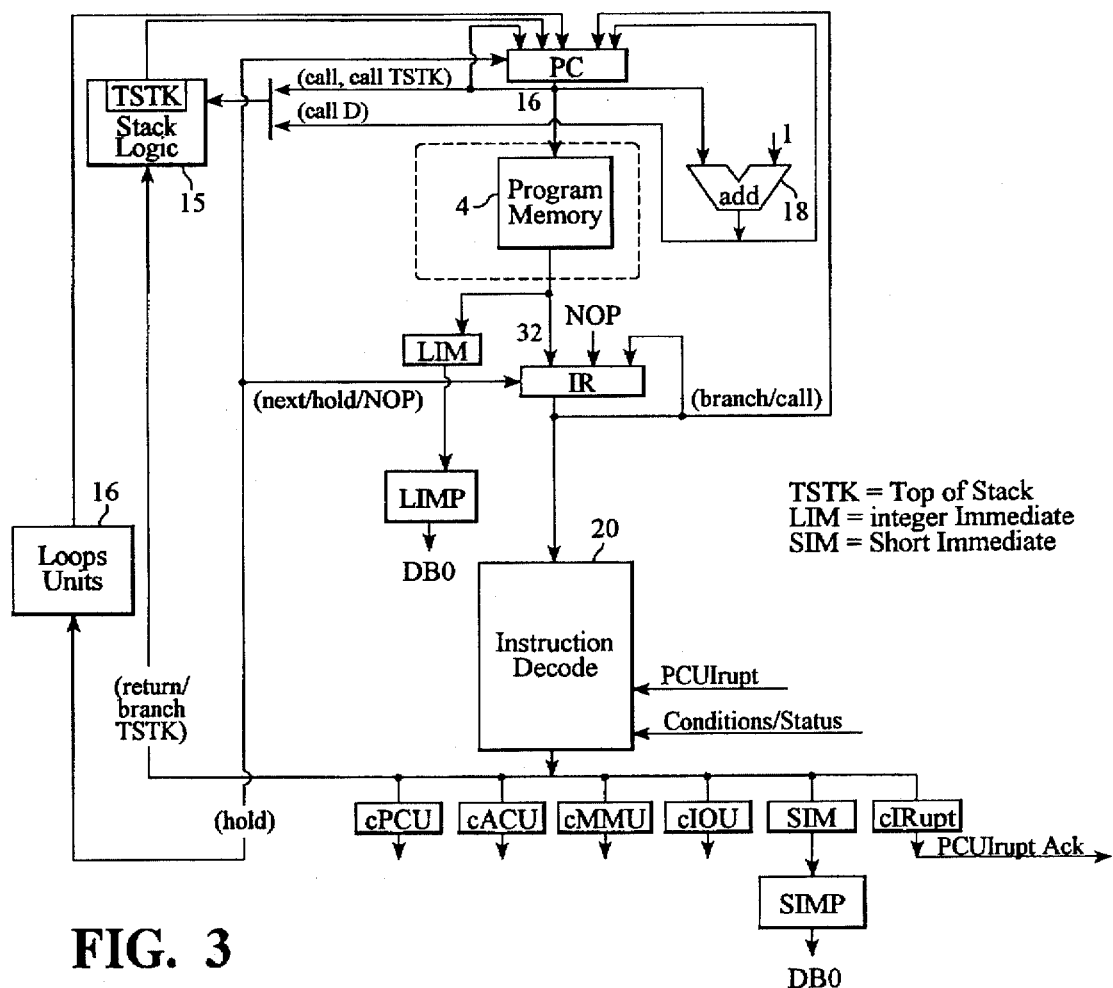
FIG. 3 is a schematic block level diagram of a preferred implementation of the program control unit of the DSP of FIG. 1 (which is programmed to implement the invention).

FIG. 3 is a diagram of a preferred implementation of program control unit (PCU) 2 of the DSP, which includes means for implementing the invention. PCU 2 of FIG. 3 receives (at instruction register IR) a sequence of 32-bit instructions from program memory 4, generates control signals for controlling execution of the instructions, and stores the control signals in selected ones of registers cPCU, cACU, cMMU, cIOU, and cIRupt.

Each 32-bit word stored in program memory 4 can be either an instruction, or a data value to be processed in accordance with one or more instructions.

As shown in FIG. 3, PCU 2 includes program counter register PC for storing a sequence of 16-bit instruction addresses (for use in addressing program memory 4), and instruction register IR for receiving a 32-bit word (either a data value or an instruction) read from program memory 4 in response to each instruction address asserted from register PC to memory 4. In executing a program comprising a sequence of instructions, PCU 2 loads a sequence of 16-bit instruction addresses into register PC for addressing program memory 4, and instruction register IR (and/or below-discussed register LIM) receives a sequence of 32-bit words (each of which is either a data value or an instruction) from program memory 4 (memory 4 asserts one 32-bit word to register IR or register LIM in response to each 16-bit instruction address asserted from register PC to memory 4).

PCU 2 also includes instruction decode unit 20 which includes logic circuitry for receiving and processing 32-bit words from instruction register IR. In response to a distinctive instruction (denoted herein as a "program memory data" instruction) received from register IR, unit 20 treats bits from program memory 4 as data values (rather than as instructions) in the sense that unit 20 causes these bits to be written (e.g., for processing in ACU 10) to a register (such as LIM or SIM), then from the register to one or more pipeline registers (e.g., LIMP or SIMP), and then from the pipeline register(s) to data bus DB0. In response to each word in register IR other than a data value designated by a program memory data instruction, unit 20 decodes such word to generate therefrom a set of control bits for controlling operation of the system (e.g., control bits which are asserted from unit 20 to register cMMU, and then from register cMMU to MMU 3 for use in controlling a read of data from data memory 6).

PCU 2 of FIG. 3 also includes stack logic 15 (including "top of stack" register TSTK), adder 18, and loop unit 16. A preferred implementation of loop unit 16 is described in the above-referenced U.S. Patent Application entitled "Digital Signal Processing Method and System Implementing Zero Overhead Nested Loops", Ser. No. 08/581,167, filed Dec. 29, 1995, filed on the same day as the present application, now U.S. Pat. No. 5,710,913.

Each time register PC asserts an instruction address to program memory 4 (during each "fetch" cycle of the pipelined operation to be described below), adder 18 increments this instruction address (by adding "1" thereto). The incremented address asserted at the output of adder 18 can be asserted directly to register PC or to stack logic 15. In one operating mode, the incremented address is asserted from adder 18 to register PC. In another operating mode, the register PC is updated with the contents of register TSTK (rather than with the output of adder 18).

Stack logic 15 implements a sixteen level deep hardware last-in-first-out (LIFO) stack for execution of program calls and returns for subroutine branching. A stack pointer selects which one of the sixteen registers is accessed. A read from register TSTK (to register PC) pops the stack, and a write to register TSTK pushes a return address into the stack. At appropriate times during execution of a sequence of instructions from memory 4, the incremented address from adder 18 is written to top of stack register TSTK (so that the incremented address is the next address loaded to program counter register PC).

When implementing the five stage instruction pipeline described below with reference to FIG. 4, it takes two cycles to execute a program branch as follows. During a fetch cycle, a branch instruction is fetched from memory 4 and saved in register IR. Then, in the decode cycle, unit 20 decodes the instruction in register IR and the branch address is placed in register PC to cause the program to branch to the new address. If the instruction is a call instruction, in the same cycle, the return address is pushed into a location in the stack pointed to by an incremented value of the stack pointer. Then, when a return from a subroutine occurs, the contents of this location are loaded (i.e., the return address) into register PC and the stack pointer is decremented.

Loop unit 16 includes logic circuitry for executing a group of instructions a pre-specified number of times, in response to control bits generated by unit 20 (which can be stored in register cPCU and then asserted from register cPCU to unit 16). Preferably, initialization of unit 16 is performed independently from operation of unit 16 (to execute looped instructions) so that initialization need not be performed in response to initialization bits which immediately precede the instructions to be looped. Also preferably, unit 16 is designed so it requires neither a special "start of loop" instruction at the beginning of the group of instructions to be looped nor a special "dedicated branch" instruction at the end of such group of instructions.

Figure 5:
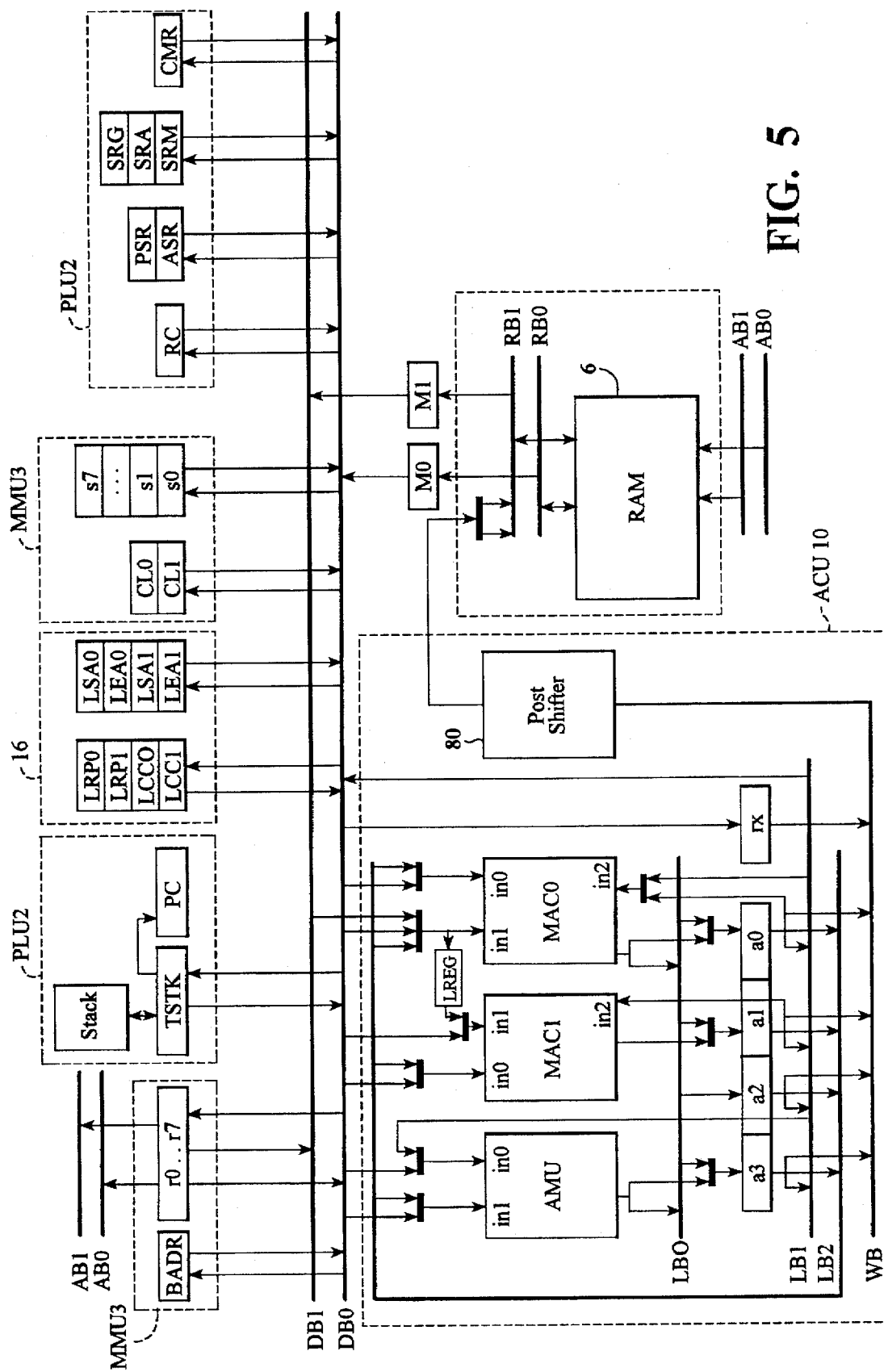
FIG. 5 is a block level diagram of the DSP of FIG. 1, showing registers and buses included therein.

PCU 2 preferably includes additional registers (e.g., repeat counter register RC, post shifter register PSR, arithmetic manipulation unit shift register ASR, status registers SRG, SRA, and SRM, and control/mode register CMR, shown in FIG. 5) for storing control and status bits for assertion to bus DB0 at appropriate times during system operation.

Figure 4:
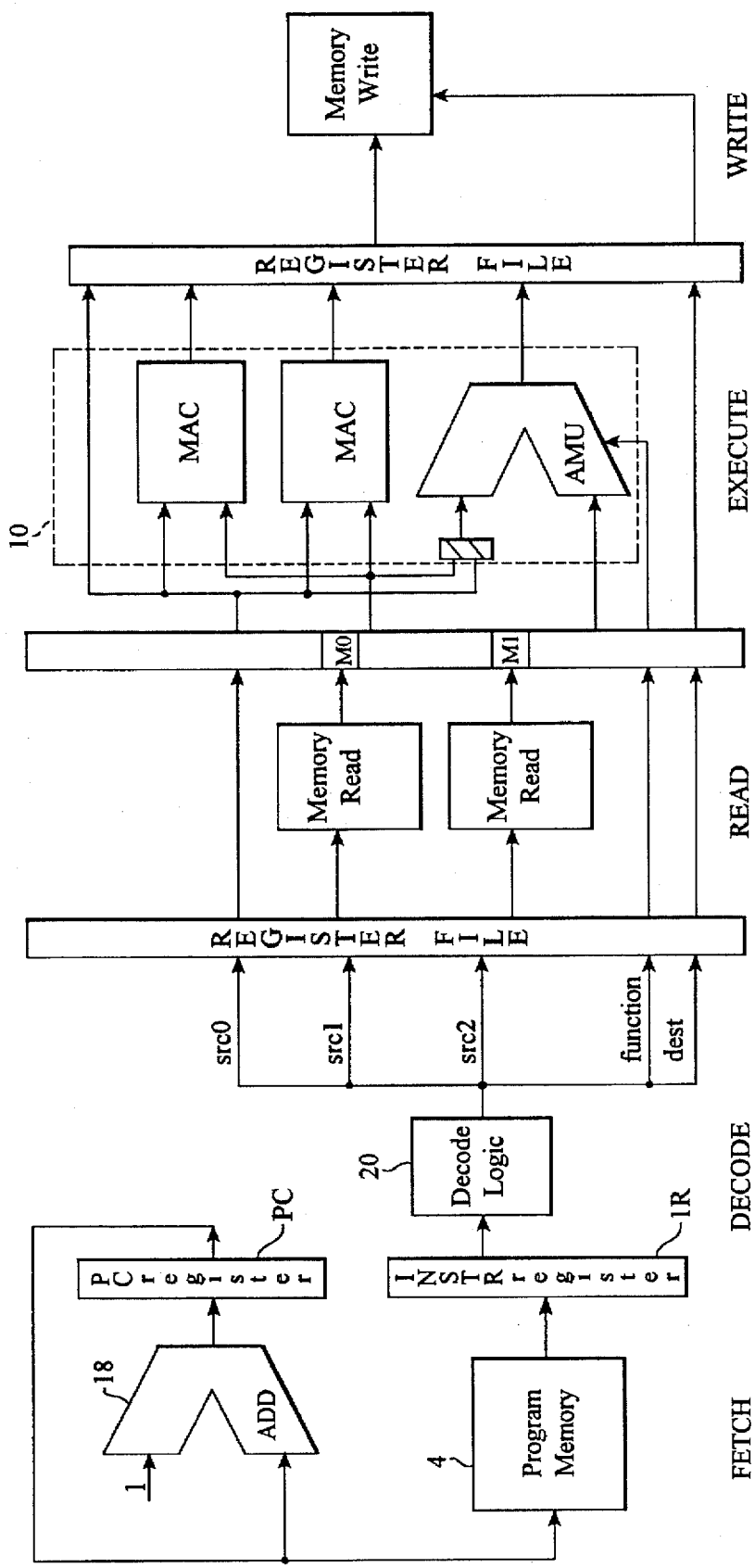
FIG. 4 is a diagram of the pipelined manner in which the DSP of FIGS. 1 and 3 preferably executes a sequence of instructions from program memory 4.

FIG. 4 is a diagram of a five stage instruction pipeline in accordance with which the DSP of FIGS. 1 and 3 (including PCU 2 shown in and described with reference to FIG. 3) preferably executes a sequence of instructions from program memory 4. This pipeline is a "five stage" pipeline in the sense that five clock cycles (referred to as "fetch," "decode," "read," "execute," and "write" cycles) are required to execute one instruction. However, a new instruction can be received from program memory 4 every clock cycle, so that the effective number of clock cycles per instruction (averaged over many clock cycles) is one. The pipeline is implemented with a "register-memory" architecture, in the sense that an access of the data memory (memory 6) is part of an instruction. This is different from a "load-store" architecture, where a memory is accessed only with a move operation (e.g., specific "load" and "store" instructions).

During the first (Fetch) cycle of the pipeline, a word (which is typically an instruction) is fetched from program memory 4. The following description of the pipeline (with reference to FIG. 4) assumes that the word is an instruction. Also during the Fetch cycle, the instruction fetched from memory 4 is put into instruction register IR, and program counter register PC is updated with a new instruction address (which can be an incremented address asserted at the output of adder 18).

Then, during the Decode cycle of the pipeline, instruction decoding unit 20 receives and decodes the instruction in register IR, thereby generating control signals (control bits) for controlling execution of the instructions. Unit 20 stores the control signals in selected ones of instruction control registers cPCU, cACU, cMMU, cIOU, and cIRupt as follows: control bits for ACU 10 are stored in register cACU, control bits for memory management unit 3 (such as control bits src0, src1, and src2) are stored in register cMMU, control bits for PCU 2 are stored in register cPCU, control bits for IOU 12 are stored in register cIOU, and control bits for an interrupt controller (optionally included within IOU 12) are stored in register CIRupt. Also, MMU 3 receives any control bits src0, src1, and/or src2 that are generated by unit 20 during the Decode cycle. MMU 3 decodes at least those of these control bits which determine addresses for reading data from memory 6, and MMU 3 generates address signals needed for performing such read operations (so that MMU 3 is ready to assert these address signals on address bus AB0 and/or address bus AB1 at the start of the next cycle of the pipeline which is the "Read" cycle of the instruction).

Then, during the Read cycle, data is read from one or two locations within data memory 6. The data read from one such location is written to register M0 (shown in FIG. 1), and the data read from the other location is written to register M1 (also shown in FIG. 1). Any post-modification of address signals to be performed by MMU 3 is also performed during the Read cycle (so that the modified address signals can be used during subsequent Read and/or Write cycles). Any data values (in contrast with instructions) fetched from program memory 4 during the preceding "Fetch" are also pipelined (transferred to their appropriate destinations) during the Read cycle.

Then, during the "Execute" cycle, computations are performed (typically by ACU 10) on the data values residing in the source registers of each data processing unit (e.g., arithmetic manipulation unit "AMU" or one of multiply/accumulate unit "MAC0" and "MAC1" within ACU 10, as shown in FIG. 5) for performing such computations. For example, ACU 10 receives and processes data values from appropriate registers (e.g., registers LIM or SIM within PCU 2, or registers M0 or M1, or registers within ACU 10) during the Execute cycle. Each data processing unit places the resulting processed data values in appropriate registers (e.g., in appropriate ones of accumulator registers a0, a1, a2, and a3 within ACU 10, as shown in FIG. 5).

Then, during the final ("Write") cycle, processed data values are written back to data memory 6. Optionally also, some post-processing such as post-shifting, is performed on the processed data values (e.g., by post shift 80 within ACU 10, as shown in FIG. 5) before they are written into memory 6.

Additional details of a preferred implementation of the "Read" and "Write" cycles of the FIG. 4 pipeline will be discussed below with reference to FIG. 5.

The control bits asserted to MMU 3 in the Decode cycle include bits which determine addresses, which in turn determine memory locations from which data are to be read (during the Read cycle) and to which processed data are to be written (during the Write cycle).

For example, PCU 2 can assert control bits src0, src1, and/or src2 to MMU 3 during the Decode cycle, where some of these control bits determine addresses of two data values to be read from two locations of. memory 6 (during the Read cycle of the instruction), and the remaining ones of the control bits determine the address of a location of memory 6 to which a processed data value (to be generated during the Execute cycle which follows the Read cycle) is to be written (during the Write cycle which follows the Execute cycle). MMU 3 can be controlled in any of several ways to generate address signals that determine these three addresses. For example, field src0 can determine an 8-bit offset to be concatenated with an 8-bit "base" address (prestored in register BADR, shown in FIG. 5, within MMU 3) to generate a 16-bit address (for one of the data values to be read from memory).

When a base address is concatenated with an 8-bit offset, this value is not stored. This concatenation happens during the READ stage and the value is placed on the address busses for a READ operation. When there is a WRITE operation, the concatenated value is placed in the address pipeline register, pipelined twice and used during the WRITE stage. This mode of addressing is called "direct addressing".

A second mode of addressing is called "indirect/register addressing". In indirect addressing, a register (r0–r7) contains the address for memory access. Register addressing means that the data will come from any of the registers which connect to DB0.

For another example, field src0 can be used for specifying a destination and a source. This mode is called "parallel source/store". The destination is "indirect addressing". The source is from a restricted list such as a0–a3 or M0.

Addresses are not generated during the DECODE cycle. Addresses are assumed to be ready. During DECODE, only control signals are generated to indicate which address will be used. Then during the READ cycle, addresses are put on the address busses (for READ operation) or into the address pipeline register (for write operation). At the same time, the address can be modified as specified by the post-modification. This assures that addresses are ready for the next instruction where they can be used again for read or write operations.

MMU 3 pipelines the addresses for read and write operations (for executing a single instruction), in the following sense. MMU 3 asserts addresses (for use in reading data from memory 6) on address bus AB0 and/or address bus AB1 at the start of the instruction's Read cycle. However, MMU 3 delays assertion of an address (for use in writing processed data to memory 6) on address bus AB0 or address bus AB1 until the start of the instruction's Write cycle, even though MMU 3 may have generated this address during a previous pipeline cycle (in response to control bits received from PCU 2 during the instruction's Decode cycle).

Preferably, the digital signal processing system of the invention includes a dedicated bus (e.g., special-purpose write bus WB shown in FIG. 5) for writing processed data bits from a data processing unit (e.g., ACU 10 as shown in FIG. 5) to a data memory (e.g., memory 6 as shown in FIG. 5) during the Write cycle of an instruction pipeline. By using such a dedicated write bus (bus WB) in addition to a general purpose data bus (bus DB0) for transferring data that has been read from memory (and control signals), the system avoids bus conflict when operating in a five stage pipeline processing mode, when the last stage is the WRITE to memory stage. In addition, the use of the dedicated write bus WB consumes less power than would otherwise be consumed using the general purpose data bus without the dedicated write bus since each time the write bus is used to write data to memory, less capacitance is switched than when using a general purpose data bus to write data to the memory.

More specifically, as shown in FIG. 5, ACU 10 preferably includes accumulator registers a0, a1, a2, and a3 (each of which is preferably a 40-bit register for storing eight guard bits, a 16-bit high order word, and a 16-bit low order word) for storing processed data values output from units AMU, MAC0, and/or MAC1 during an Execute cycle. Also within ACU 10, three local buses (LB0, LB1, LB2) interconnect the output and input of each of ACU 10's processor units AMU, MAC0, and MAC1 with accumulator registers a0, a1, a2, and a3.

A first portion of dedicated write back bus WB connects accumulator registers a0, a1, a2, and a3 or register "rx" with the input of post shift unit 80, and a second portion of bus WB connects the output of post shift unit 80 to RAM bus 0 (RB0) and/or to RAM bus 1 (RB1). Register "rx" is a pipeline register that buffers data in the EXECUTE cycle before the data is written to data memory 6 during the WRITE cycle. Register "rx" is used when data is written to memory from any of the registers which connect to DB0. The function of post shift unit 80 is to shift (to the right or to the left) the bits of each 40-bit data value transferred from one of the accumulator registers (or register rx) over bus WB (during the Write cycle of an instruction), and to select a subset of the shifted bits for assertion to bus RB0 or bus RB1. By connecting post shift unit 80 closer to accumulator registers a0, a1, a2, and a3 than to buses RB0 and RB1, a relatively long portion of write bus WB (the portion between unit 80 and buses RB0 and RB1) can have smaller width (e.g., 16-bits) than the other portion of write bus WB (the portion between registers a0–a3 and unit 80).

At the start of each Write cycle, post shift unit 80 receives a 40-bit data value from any of accumulator registers a0, a1, a2, and a3, or register RX and shifts the bits thereof. Either the 16 higher-order bits of the value (typically a shifted value, but alternatively a zero shifted value) output from unit 80, or the 16 lower-order bits thereof (typically a shifted value, but alternatively a zero shifted value) output from unit 80, are transferred over bus WB from unit 80 to a selected one of bus RB0 and bus RB1. Each 16-bit data value placed on bus RB0 (from unit 80) is written (through one port of data memory 6) to a memory location in memory 6 determined by an address that has been asserted to address bus AB0 from MMU 3 (during the same Write cycle), and each 16-bit data value placed on bus RB1 (from unit 80) is written (through the other port of data memory 6) to a memory location in memory 6 determined by an address that is asserted to address bus AB1 from MMU 3 (during the same Write cycle). Thus, in effect, any 16-bit portion of a data value in one of registers a0, a1, a2, a3, and rx can be written during the Write cycle to memory 6. When no shift (i.e., a zero shift) is implemented by unit 80, unit 80 preferably operates in a default mode in which it asserts to bus RB0 (or RB1) the 16-bit "higher-order word" portion of the 40-bit value asserted from one of registers a0, a1, a2, and a3 to the input of unit 80. Alternatively, zero shift could be specified with the 16-bit lower-word portion of the 40-bit value asserted.

Control bits determining the amount of each shift to be performed by unit 80 are written by PCU 2 to "post shift" register PSR (shown in FIG. 5) in response to an instruction from program memory 4. The PSR is not, however, loaded during the same post shift instruction. The PSR can be loaded in a separate move instruction in the PCU 2 and then later used in a post-shifting instruction or a post-shift value is specified in the same post-shifting instruction. In the latter case, PSR is not affected and its contents are not altered with that post shift value. In addition, unit 80 operates in response to control bits in control/mode register CMR, which has a control bit of PSRd is (or PSR disable), which determines whether or not the post-shifting operation uses the PSR register.

Preferably, the system of the invention is programmed to execute instructions in a pipelined manner (in which addresses for reads from a memory are asserted on an address bus in one pipeline cycle and addresses for writes to the memory are asserted on the same address bus in a different pipeline cycle), and in a manner avoiding expected address bus and data bus conflicts or collisions.

An example of a collision that should be expected to occur (on address bus AB0 or AB1) when the FIG. 5 system implements the described five-cycle instruction pipeline, is a result of the following structural hazard: the Write cycle of an instruction (instruction "i") conflicts with the Read cycle of the second instruction thereafter (instruction "i+2") when three addresses (two addresses of data for executing instruction "i+2" and one for writing the result of execution of instruction "i") are to be transferred over two address buses (AB0 and AB1) during that cycle. Thus, two addresses are undesirably asserted over one address bus during the same cycle. There are several ways in which the system can be programmed to resolve such a conflict. For example, MMU 3 can be designed to include at least one multiplexer which makes a selection between two address values to be asserted to one address bus during the same cycle (e.g., by assigning a lower priority to a read address than to a write address, and thus selecting a write address for instruction "i" over a read address for instruction "i+2"). Where such a multiplexer is employed, MMU 3 preferably also includes circuitry for asserting a warning signal when the multiplexer drops one address (e.g., a read address for instruction "i+2") in favor of another address (e.g., a write address for instruction "i") having higher priority.

However, it is preferable to resolve a conflict of the type noted in the previous paragraph by programming the system to implement a pipeline stall, in which the Read cycle of instruction "i+2" is delayed relative to the Write cycle of instruction "i" in the event of the described conflict. One implementation of such a pipeline stall is as follows. The circuitry within MMU 3 for generating addresses (in response to control bits from PCU 2) is designed to include means for generating a delay signal when a read address for instruction "i+2" is generated (e.g., during the Decode cycle of instruction "i+2") at a time when a write address for instruction "i" has already been generated. This warning signal is asserted to PCU 2. In response to the warning signal, MMU 3 aborts the process of generating addresses for instruction "i+2" (during the Decode cycle of instruction "i+2"), PCU 2 holds instruction "i+2" in instruction register IR for an additional cycle (a hold cycle), PCU 2 fetches no new instruction during the hold cycle (PCU 2 delays fetching instruction "i+3" until the cycle following the hold cycle), and PCU 2 decodes instruction "i+2" during the hold cycle and sends control bits to MMU 3 for implementing instruction "i+2" during the hold cycle (and in response, MMU 3 generates addresses for implementing instruction "i+2" during the hold cycle). Thus, execution of instruction "i+2" (and thus the "Read" cycle of instruction "i+2") is delayed by one cycle relative to the "Write" cycle of instruction "i". In the event that MMU 3 again detects a conflict of the same type, during generation of addresses for instruction "i+2," it again generates the delay signal (which indicates this time that a read address for instruction "i+2" is being generated at a time when a write address for instruction "i+1" has already been generated), and execution of instruction "i+2" is again delayed (for an additional hold cycle).

Figure 6:
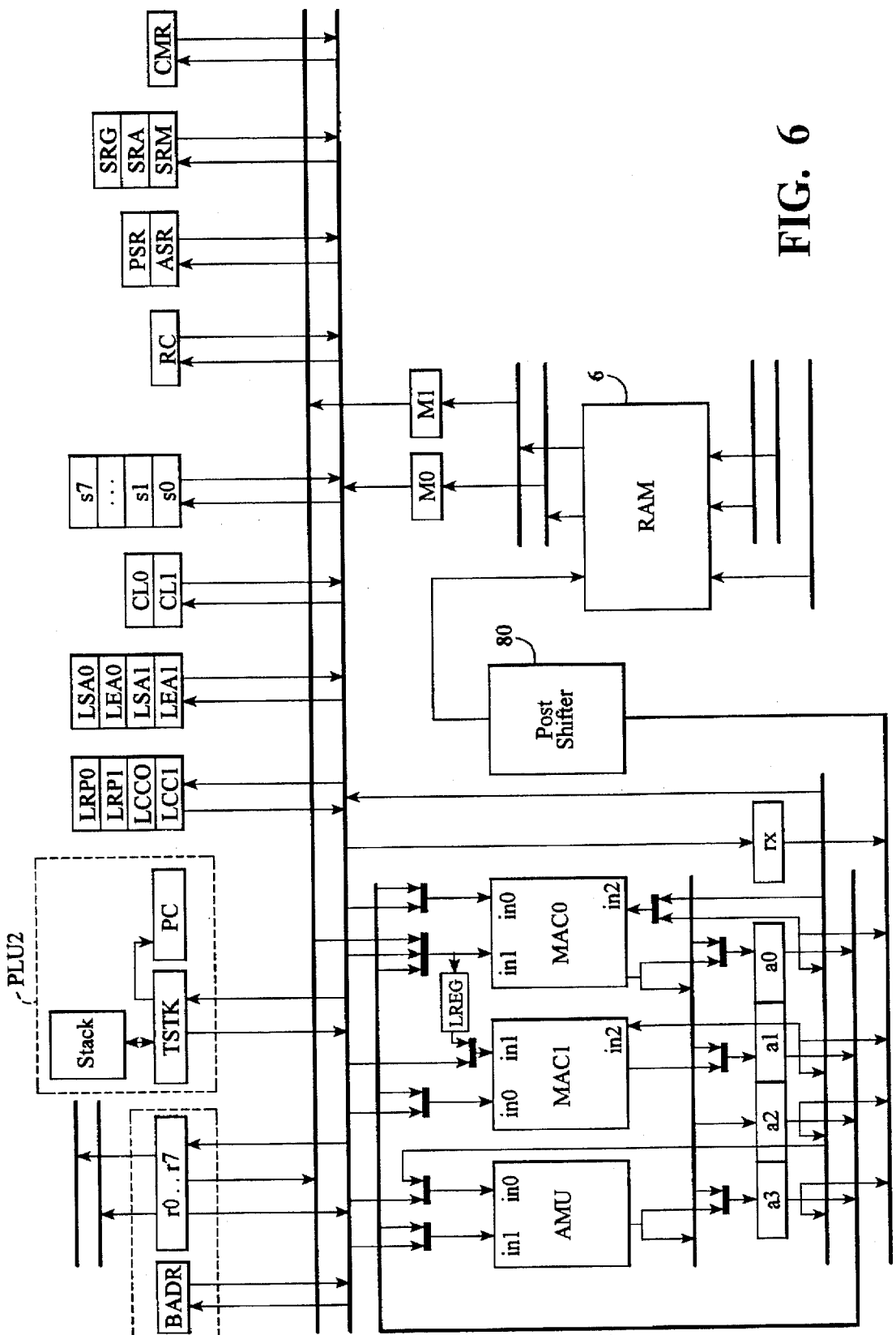
FIG. 6 is a block level diagram of a variation on the DSP of FIG. 1, showing registers and buses included therein.

The use of a pipeline stall can be avoided and the conflict resolved if the memory 6 were a three port memory, with three independent address generating circuits, operating three independent address busses to the memory 6, and with three data busses from the memory 6. The latter architecture is shown in FIG. 6, which is a block diagram of a variation on the DSP of FIG. 5. In the FIG. 6 embodiment of the invention, RAM 6' (which has three ports) replaces RAM 6 of FIG. 5, and three address busses (AB0, AB1, and AB2) supply address values to RAM 6'.

Another example of a conflict that should be expected to occur when the FIG. 5 system implements the described five-cycle instruction pipeline, is a result of the following data hazard: instruction "i" can specify generation of a final data value (to be written to data memory 6), where instruction "i+1" specifies a data processing operation which requires the final data value as an operand. However, since the Write cycle of instruction "i" occurs after the Read cycle of instruction "i+1," the Read cycle of instruction "i+1" will not accomplish reading of the correct data value (and will instead accomplish reading of an incorrect data value, which is a value which just happens to be in a memory location of memory 6 at a time two cycles before the result of instruction "i" is written to that memory location). It is preferred that a programmer avoid this type of hazard by carefully coding each instruction sequence to be executed by the system to avoid such a hazard (i.e., the programmer should avoid storing in program memory 4 a sequence of instructions that would give rise to such a hazard).

Preferred embodiments of the method and system of the invention have been described with reference to FIGS. 1 and 3–5. Although these embodiments have been described in some detail, it is contemplated that many changes from (and variations on) these embodiments can be made without departing from the spirit and scope of the invention as defined by the appended claims.

What is claimed is:

1. A method for controlling operation of a digital signal processing system for executing instructions in a pipelined manner to process data, said system including a memory, said method including the steps of:
   (a) decoding a first one of the instructions during a first cycle;
   (b) during a second cycle, reading from the memory a first set of data bits determined by the first one of the instructions, and decoding a second one of the instructions; and
   (c) during at least one cycle after the second cycle;
      (i) processing the first set of data bits to generate a first set of processed data bits and writing the first set of processed data bits to the memory
      (ii) during a third cycle, processing the first set of data bits to generate the first set of processed data bits, reading from the memory a second set of data bits determined by the second one of the instructions, and decoding a third one of the instructions; and
      (iii) during a fourth cycle, writing the first set of processed data bits to the memory, processing the second set of data bits to generate a second set of processed data bits, reading from the memory a third set of data bits determined by the third one of the instructions, and decoding a fourth one of the instructions.

2. The method of claim 1, wherein step (a) includes the step
   generating first control signals which determine a first set of addresses, in response to said first one of the instructions decoded being a read and write instruction, and wherein the first set of addresses determine at least one memory location from which the first set of data bits are to be read and at least one memory location to which the first set of processed data bits are to be written.

3. The method of claim 2, wherein the system includes a memory management unit, and wherein step (a) also includes the step of:
   asserting the first control signals to the memory management unit, and operating the memory management unit in response to the first control signals.

4. The method of claim 2, wherein the system includes a program control unit for receiving a sequence of the instructions and generating the first control signals, a memory management unit for generating the first set of addresses, and a data processing unit for processing the first set of data bits to generate the first set of processed data bits, wherein the data processing unit is connected along a data bus, and wherein step (c) includes the step of:
   asserting the first set of processed data bits over a dedicated write bus to the memory.

5. A method for controlling operation of a digital signal processing system for executing instructions in a pipelined manner to process data, said system including a memory and an address bus, said method including the steps of:
   (a) decoding a first one of the instructions during a first cycle;
   (b) during a second cycle, reading from the memory a first set of data bits determined by the first one of the instructions, and decoding a second one of the instructions; and
   (c) during at least one cycle after the second cycle;
      (i) processing the first set of data bits to generate a first set of processed data bits and writing the first set of processed data bits to the memory;
      (ii) processing the first set of data bits to generate the first set of processed data bits;
      (iii) reading from the memory a second set of data bits determined by the second one of the instructions;
      (iv) decoding a third one of the instructions;
      (v) identifying a potential address bus conflict in which both a first address for writing at least a subset of the first set of processed data bits to the memory and a second address for reading from the memory at least a subset of a third set of data bits determined by the third one of the instructions are to be asserted on a single address bus; and
      (vi) implement a pipeline stall to avoid the potential address bus conflict.

6. The method of claim 5, wherein steps (ii), (iii), (iv), and (v) are performed during a third cycle, and wherein step (vi) includes the steps of:
   during a fourth cycle, again decoding the third one of the instructions, writing the first set of processed data bits to the memory, and processing the second set of data bits to generate a second set of processed data bits; and
   during the fifth cycle, reading from the memory the third set of data bits determined by the third one of the instructions, and decoding a fourth one of the instructions.

7. A digital signal processing system for executing instructions in a pipelined manner to process data, said system including:
   a memory;
   a means for decoding a first one of the instructions during a first cycle, decoding a second one of the instructions during a second cycle, and a third one of the instructions during a third cycle;
   a means for reading from the memory a first set of data bits determined by the first one of the instructions during the second cycle, and reading from the memory a second set of data bits determined by the second one of the instructions during the third cycle;
   a means for processing the first set of data bits to generate a first set of processed data bits during the third cycle, and processing the second set of data bits to generate a second set of processed data bits during a fourth cycle; and
   a means for writing the first set of processed data bits to the memory during at least one cycle after the third cycle.

8. The system of claim 7, also including:
   an address bus connected to the memory and to the means for reading;
   a means for identifying a potential address bus conflict in which both a first address for writing at least a subset of the first set of processed data bits to the memory and a second address for reading from the memory at least a subset of a third set of data bits determined by the third one of the instructions are to be asserted on the address bus; and
   a means for implementing a pipeline stall to avoid the potential conflict.

9. The system of claim 7, also including:
   a general purpose data bus along which the means for processing is connected; and
   wherein the means for writing the first set of processed data bits to the memory includes a write bus connected between the means for processing and the memory.

10. A digital signal processing system, for executing instructions in a pipelined manner to process data, said system including:

a memory;

a general purpose data bus;

an address bus;

a program control unit including means for decoding a first one of the instructions during a first cycle, decoding a second one of the instructions during a second cycle, and a third one of the instructions during a third cycle;

a memory management unit connected to both the data bus of a read stage, and the address bus, and including means for generating a first address signal set including at least one address signal for reading from the memory a first set of data bits determined by the first one of the instructions during the second cycle, a second address signal set including at least one address signal for reading from the memory a second set of data bits determined by the second one of the instructions during the third cycle, and a third address signal for writing the first set of processed data bits to the memory during at least one cycle after the third cycle; and a data processing means connected along the data bus for processing the first set of data bits to generate a first set of processed data bits during the third cycle, and processing the second set of data bits to generate a second set of processed data bits during a fourth cycle.

11. The system of claim 10, also including:

a write bus connected between the data processing means and the memory, for receiving the first set of processed data bits and the second set of processed data bits from the data processing unit, and providing at least a subset of the first set of processed data bits to the memory and at least a subset of the second set of processed data bits to the memory.

12. The system of claim 11, also including:

a shift means connected along the write bus for generating a first shifted set of bits from the first set of processed data bits and a second shifted set of bits from the second set of processed data bits, and providing at least a subset of the first shifted set of bits to the memory and at least a subset of the second shifted set of bits to the memory.

* * * * *